United States Patent [19]

Wyner

[11] 4,395,457

[45] Jul. 26, 1983

[54] THERMAL INSULATING AND WATERPROOFING OF MASONRY STRUCTURES BY ENTRAPMENT OF MULTILAYERED DEAD AIR SPACES WITH USE OF HIGH SPEED INJECTED LIQUID-AIR STREAM

[75] Inventor: Jay S. Wyner, Sands Point, N.Y.

[73] Assignee: Therma-Plex Corporation, Long Island City, N.Y.

[21] Appl. No.: 230,257

[22] Filed: Jan. 30, 1981

Related U.S. Application Data

[63] Continuation-in-part of Ser. No. 126,194, Mar. 3, 1980, abandoned.

[51] Int. Cl.$^3$ .................................... B32B 3/26

[52] U.S. Cl. .................... 428/312.4; 52/309.17; 52/515; 52/612; 427/402; 427/407.1; 427/421; 427/422; 427/426; 428/319.7; 118/300

[58] Field of Search .............. 427/255.7, 402, 421, 427/422, 426, 407.1, 393.6; 52/309.17, 515, 612, 744, 743; 428/304, 307.3, 312.4, 319.7, 320.2, 327.7

[56] References Cited

U.S. PATENT DOCUMENTS

| | | | |
|---|---|---|---|
| 3,870,546 | 3/1975 | Gelsomino | 427/407.1 X |
| 4,002,788 | 1/1977 | Lott | 427/393.6 X |
| 4,091,124 | 5/1978 | Reighter | 427/407.1 X |
| 4,130,973 | 12/1978 | Gustavsson | 52/309.17 |
| 4,204,495 | 5/1980 | Wyner | 118/300 |

*Primary Examiner*—Norman Morgenstern
*Assistant Examiner*—Thurman K. Page

[57] ABSTRACT

A thermally insulated masonry wall comprising a plurality of thermally insulated barrier layers extending laterally inwardly from the surface of the wall. This is accomplished by placing a nozzle against the surface of the wall and blasting a pulsating air stream containing a thermal insulating liquid which penetrates through the surface of the wall to provide a first barrier layer embedded deeply in the wall and laterally spaced inwardly from its surface. A second operation provides a second but shallower barrier layer. This can be followed by a third or more applications. Each of the resulting barrier layers comprises particles of masonry material coated with thermal insulating liquid and entrapping air in the interstices formed by the coated masonry particles.

7 Claims, 10 Drawing Figures

THERMAL INSULATING AND WATERPROOFING OF MASONRY STRUCTURES BY ENTRAPMENT OF MULTILAYERED DEAD AIR SPACES WITH USE OF HIGH SPEED INJECTED LIQUID-AIR STREAM

This is a continuation-in-part of U.S. patent application, Ser. No. 126,194 filed Mar. 3, 1980, now abandoned.

BACKGROUND OF THE INVENTION

Substantial amounts of energy are wasted in the heating and cooling of masonry buildings because of the relatively poor insulating qualities of masonry materials, as well as its porosity, which permit high wind driven rains to penetrate deeply into the surfaces of the masonry walls of the buildings. Moisture intrusion into the masonry walls of the buildings causes BTU heat loss in the buildings as the heat in the buildings is utilized in evaporating the moisture.

Attempts to correct this situation have been made by spraying a resinous coating that atomizes the liquid material with an air stream. Other means of applying materials have been made by roller and brush application. At most, the three types of applications have resulted in a relatively thin veneer coating on the outer surface of the wall.

If an aspirator spray gun were held too close to the masonry wall surface, the resinous material would splatter. This is caused by the inability of the stone particles to absorb, by capillary action, the on-going atomized liquid material. Therefore, a spray device must be kept at a proper distance, say 10 or 12 inches away from the wall to prevent overrun. Atmospheric pressure application results. A capillary absorption of only about 1/32 to $\frac{1}{8}$ of an inch can only produce a thin veneer coating on the outer surface. While this has improved the waterproofing quality of the masonry wall as compared to the untreated wall, this has still not proved completely satisfactory to obtain a decisive depth of penetration in a masonry building wherein sufficient dead air cells are entrapped for effective insulation.

The present invention provides a thermal insulated masonry wall comprised of layers of thermally insulated barriers extending laterally inwardly from the surface of the wall. This effectively encloses the masonry building in a thermal protecting envelope which reduces the energy needs of the building for air conditioning during the warm months and for heating the building during the cold months.

While the thermal insulating liquid is forced by pulsating air pressure, the stone granules in a masonry structure absorb the liquid by capillary action combined and pushed by the pulsating force to air-inject the liquid to a greater depth of penetration that would not be readily achieved by an ordinary continuous air velocity in the masonry structure. The pulsation effects a rapid stored-and-release of energy that forces the liquid to penetrate deeper to encapsulate the stone granules and air pockets at a higher rate thereby reducing splatter and overrun.

The entrapped dead air cells between the stone granules act as a thermal insulating barrier. The multiple layers of entrapped air pockets provide two main functions:

1. A waterproofing effect to prevent further moisture into the masonry structure. This moisture, if allowed to enter, would rob BTU heat losses in the winter as well as cooled air conditioning energy in the summer by evaporation. Also, the effect is to preserve the masonry against pollutants, aging and decay.

2. The multiple layers of dead air cells provide a multiple insulating effect on a masonry structure without changing its appearance since the thermal insulating coating has been air-injected deeply into the lattices of the stone crevices which has been observed to relieve vapor stresses by breathing. The multiple thermal and waterproofing protective insulation layers are more than skin deep. This differs from a series of deposits or thin veneers that can build up on the outer surface by multiple spray, roller or brush applications which often change surface appearances with a thick outer layer which can crack or peel by internal vapor stresses.

SUMMARY OF THE INVENTION

A thermally insulated masonry wall is provided comprised of layers of thermally insulating barriers extendin side-by-side relation laterally inwardly from the surface of the wall.

A method of making such a wall comprises providing a stream of air flowing at a high blasting velocity, injecting into said stream a thermal insulating liquid to form a stream of a thermal insulating liquid-air mixture flowing at said velocity, applying in a blasting fashion said flowing liquid-air mixture stream at said velocity to the surface of said masonry wall for a particular period of time, and thereafter repeating the operation but varying the velocity of the stream, or the time of application, or the viscosity of the liquid, or its temperature, or any combination of the foregoing, whereby said masonry wall is provided with a thermal insulating barrier.

A suitable apparatus for practicing the method of the invention comprises an air blower, tube means extending therefrom and having a rotary disk mounted in said tube means in the path of flow of the air stream from said blower on an axis extending transversely of said tube means for rotation of said disk in said tube means to thereby cause said air stream to flow in continuous pulses, a cone-shaped nozzle mounted on said tube means downstream of said disk, and an aspirator mounted on said nozzle having means for supplying a thermal insulating liquid thereto, whereby during operation a stream of a thermally insulating liquid-air mixture is directed by said nozzle against the surface of said masonry wall in a blasting fashion during the placement of said nozzle against said surface for creating a layer of a thermal insulating barrier in said wall laterally inwardly of the surface of the wall.

DETAILED DESCRIPTION

It has been discovered that the thermal insulating properties of masonry walls can be substantially improved by the creation of a layered thermal insulating barrier extending laterally inwardly from the surface of the wall. The masonry wall can be brick, stone, sandstone, marble, mortar, cement, concrete, stucco, combinations thereof, and the like. These materials vary in porosity and density.

Figure 8:
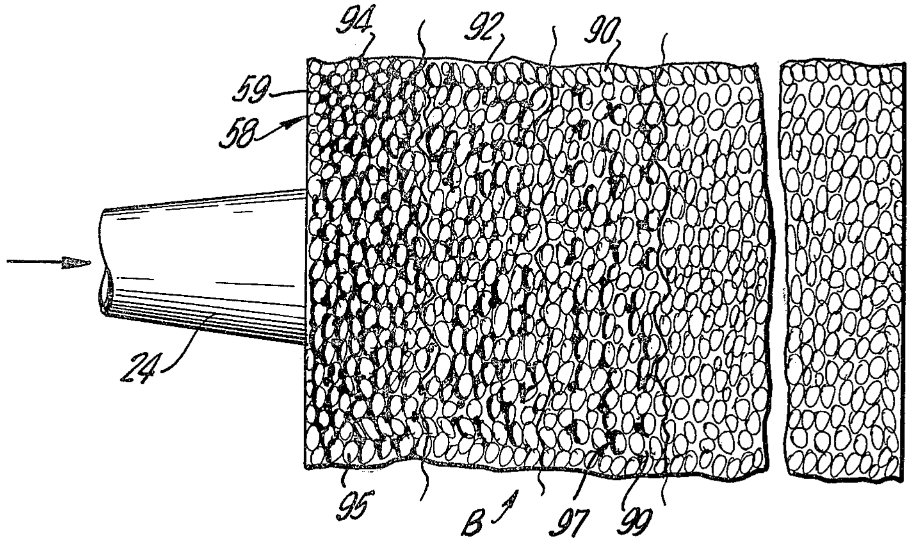
FIG. 8 is a cross section of a masonry wall in accordance with the invention, showing part of the nozzle of the apparatus of the invention.

As shown in FIG. 8, masonry wall 58 is provided with a thermal insulating barrier B comprised of a first deeply embedded thermal insulating barrier layer 90. The depth of layer 90 varies depending upon the porosity and density of the masonry material of the wall and the method of forming the layer, as described more in detail hereinafter. In general, layer 90 is formed more deeply embedded in the wall in those cases where the masonry material is more porous and less dense than other masonry material, as for example, marble.

Adjacent to barrier layer 90, in side-by-side relation therewith, is a shallower thermal insulating barrier layer 92, also spaced laterally inwardly from surface 59 of wall 58. A third barrier layer 94 extends from surface 59 of wall 58 inwardly to adjacent layer 92. It should be understood that the layers are in juxtaposition with each other but their boundaries do not form a sharp line of division, as can be seen from FIG. 8.

The aggregate or particles 95 of the masonry material of the wall 58 is covered by a thermal insulating liquid 97 thereby entrapping air in the interstices 99 formed by the coated aggregate. However, it is not known if complete covering of the aggregate or particles occurs. It is believed that the entrapped air occurs throughout the layers and some of the interstices are filled by the thermal insulating liquid. The thermal insulating liquid is a composition of polymerized methacrylic resins. The preferred composition is sold under the trademark THERMA-PLEX and is obtainable from the THERMA-PLEX CORPORATION, 12-08 37th Avenue, Long Island City, N.Y. 11101.

The resulting thermal insulating barrier B of the wall is very effective in providing an insulating thermal barrier which reduces heat losses through the wall during cold weather as well as the loss of cooled air through the wall during the air conditioning season. The thermal insulating barrier is also effective in waterproofing the wall and preventing moisture from passing through the wall into the heated room, thereby further reducing the energy load required to heat the room. The entrapped air in the interstices 99 of the wall and between the barrier layers 90, 92 and 94 are extremely effective in providing excellent thermal insulating qualities to the wall. The wall can be provided with two or more thermal barrier layers.

Figure 1:
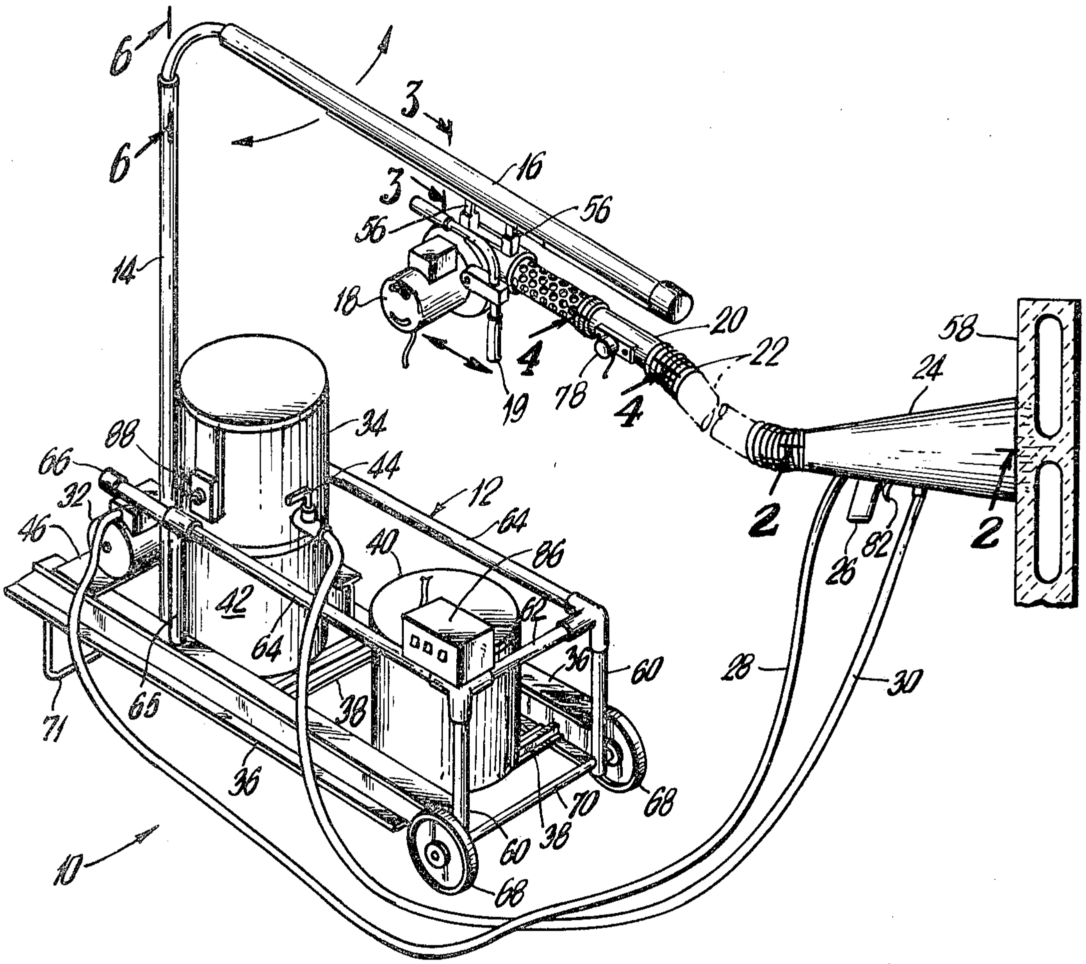
FIG. 1 is a perspective view of the apparatus of the present invention.
Figure 2:
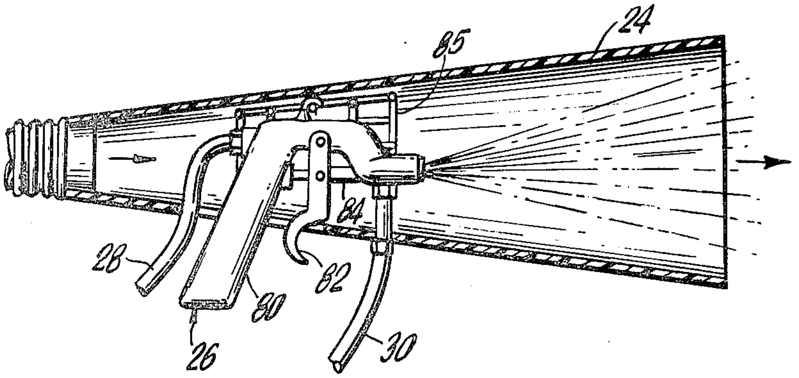
FIG. 2 is a cross section taken on line 2—2 of FIG. 1 and on a larger scale.

The apparatus 10 of FIG. 1 is useful in applying the thermal insulating liquid to the surface 59 of wall 58 to penetrate the surface and embed thermal insulating barrier layers in the wall. The apparatus comprises a mobile platform or carriage 12 having a support pipe 14 extending vertically upwardly and supporting a horizontal arm 16. Suspended from arm 16 is an air blower and heater 18 to which is attached a pipe 20. Heater 18 has a handle 19. A flexible hose 22 extends from pipe 29 and has a cone-shaped nozzle 24 attached to its end. Nozzle 24 carries an aspirator 26, as best seen in FIG. 2. Hoses 28 and 30 interconnect the aspirator to an air pump 32, supported on carriage 12, and a liquid container 34, also supported on the carriage.

Carriage 12 is constructed so that it can be easily moved on scaffolding which would be placed along the walls of the masonry building which is to be thermally insulated. Accordingly, it comprises a pair of laterally spaced rails 36 interconnected by cross-beams 38. Extra liquid containers 40 and 42 rest on the cross-beams. Container 34 sits on top of container 42 to aid in the gravity flow of thermal insulating liquid from container 34 which has a shut-off valve 44. Aspirator air pump 32 is supported on carriage 12 by a crossbeam 46.

Figure 3:
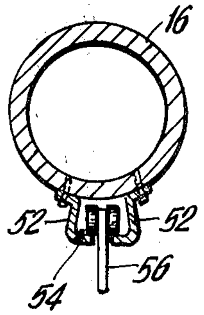
FIG. 3 is a cross section taken on line 3—3 of FIG. 1 and on a larger scale.
Figure 6:
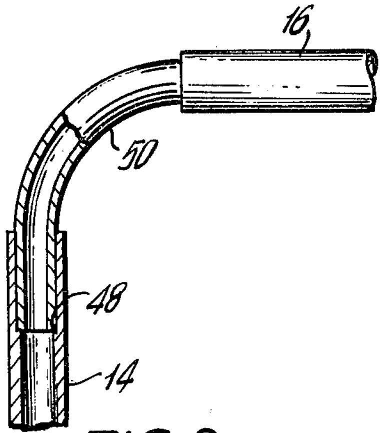
FIG. 6 is a detailed section taken on line 6—6 of FIG. 1 and on a larger scale.
Figure 5A:
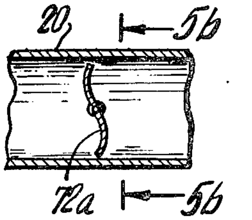
FIG. 5*a* is a cross section showing a modification.
Figure 5B:
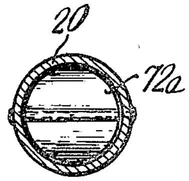
FIG. 5*b* is a cross section taken on line 5*b*—5*b* of FIG. 5*a;*

As best seen in FIG. 6, pipe 14 has an inner shoulder 48 which supports for rotation thereon a right angle pipe elbow 50 to which is secured pipe 16. As best seen in FIG. 3, pipe 16 has a pair of longitudinally extending support members 52 laterally spaced from each other to form a track 54. Suspended from the track are roller guides 56 from which is suspended air blower and heater 18 for longitudinal movement along arm 16. Thus it may be seen that the air blower and heater and the nozzle attached thereto can be readily moved horizontally toward and away from a vertical masonry wall 58 (FIG. 1), as well as rotated toward and away from the wall.

Carriage 12 has vertical pipes 60 extending upwardly from rails 36 and horizontal pipes 62 and 64 which are connected to pipes 60. Pipes 64 are also supported by vertical uprights 65. Pipes 64 extend from the front of the carriage to its rear where handles 66 are provided for gripping the carriage and moving it into position along wheels 68, very much like one would move a wheelbarrel. The wheels are mounted for rotation at the ends of an axle 70 secured to pipes 60. A pair of rear carriage supports 71 are secured to rails 36.

Figure 4:
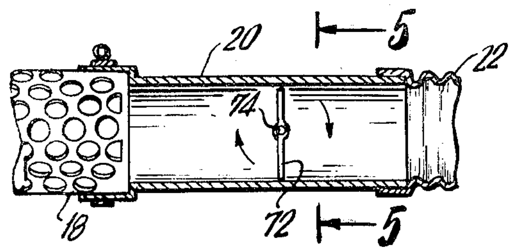
FIG. 4 is a cross section taken on line 4—4 of FIG. 1 and on a larger scale.
Figure 5:
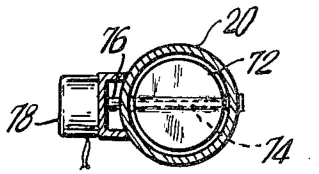
FIG. 5 is a cross section taken on line 5—5 of FIG. 4.

As best seen in FIGS. 4 and 5, pipe 20 is provided with a rotary disk 72 mounted on rod 74 which extends transversely of the pipe and is connected to a drive shaft 76 of an electric motor 78.

As best seen in FIG. 2, aspirator 26 includes a handle 80 and a trigger switch 82 which operates the valve 84 of the aspirator for controlling the flow of the thermal insulating liquid from container 34. The aspirator is supported in nozzle 24 by supports 85.

Air blower and heater 18 is controlled by switch mechanism 86 (FIG. 1) so that the blower and heater can operate in three different conditions. Maximum blower speed with maximum heating temperature. Intermediate blower speed with an intermediate heating temperature, and a still lower speed and lower temperature, heat being optional depending upon outside temperature. In addition, container 34 is provided with a heater 88 (FIG. 1) for heating the thermal insulating liquid in the container, if necessary. It is preferred that the maximum blower speed provide an air blast at a velocity between about 8,000 and 12,000 feet per minute applied from about 10 to 12 seconds. Such a velocity and time have been found necessary to provide a deeply embedded thermal barrier layer in concrete, depending upon the absorption rate.

In the operation of apparatus 10, carriage 12 is rolled into position and the operator places nozzle 24 against wall 58 by rotating arm 16 and moving blower and heater 18 along the arm. Switch 86 is then operated causing aspirator pump 32, blower and heater 18, and motor 78 to operate. The initial operation will be at a particular speed and temperature of the blower and heater 18. Operation of pump 32 will aspirate the thermal insulating liquid from its container 34, through tube 30, to aspirator 26 where, upon operation of trigger 82, it is injected into nozzle 24 in the form of a liquid-air mixture, as best shown in FIG. 2. Concurrently, a stream of heated air will flow from blower and heater 18, through pipe 20, where rotating disk 72 will impart a pulsating movement to its flow. The pulsating flowing stream of air will carry the liquid-air mixture aspirated into nozzle 24 against the surface of wall 58 in a blasting action to cause the thermal insulating liquid to deeply penetrate the wall and form the first and deep layer 90 of thermal barrier B (FIG. 8) comprised of the particles of the masonry wall, substantially coated with the thermal insulating liquid, and entrapped air therebetween. After layer 90 is formed, a second operation of the apparatus occurs to form layer 92. If necessary, a third layer 94 is formed by operating the apparatus again.

Instead of using a motor operated rotary disk to impart pulsations to the air stream, an S-shaped disk *72a* (FIGS. *5a* and *5b*) can be provided in tube 20 which, because of its shape, is rotated by the flow of the air stream in the tube.

Figure 7:
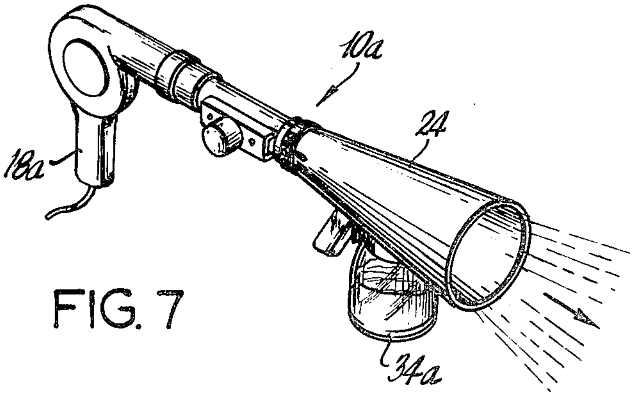
FIG. 7 is a perspective view of a portable version of the apparatus of the present invention.

FIG. 7 shows a portable apparatus 10*a* in accordance with the invention and in which the blower and heater 18*a* provides the aspirating air for aspirating the thermal insulating liquid from an aspirator supply container 34*a* into nozzle 24. The aspirator supply container can also be separate and interconnected to the aspirator by a tube.

The shallower thermal barrier layers 92 and 94 can be provided in the masonry wall by varying any one of the following characteristics of the liquid-air stream or by varying any combination of them: the time of application of the liquid-air stream to the surface of the wall; the temperature of the liquid-air stream; the velocity or speed of the liquid-air stream (the blasting force); or the viscosity of the liquid in the liquid-air stream. Since the shallower thermal barrier layer should not penetrate into the masonry wall as deeply as the first thermal barrier layer, the liquid-air stream may be applied to the surface of the masonry wall with a lower speed, say 6,000 to 8,000 feet per minute, and for a shorter period of time, say 5 to 8 seconds than that for the initial application. Shallower penetration will also occur if the same period of time is used for the second layer as for the first but with liquid having a greater viscosity than the liquid of the first layer. The temperature of the liquid-air stream may also be varied. A lower temperature will result in shallower penetration. Also, the time of application can be the same but shallower penetration will occur if the liquid-air stream is applied to the surface of the masonry wall at a lower velocity. Lesser depth of penetration may even be accomplished by reducing the pulsations using smaller size valves in the tube or even eliminating them altogether. In summary then, shallower penetration occurs when the speed of the stream of the liquid-air mixture is lowered, or when the viscosity of the liquid is increased, or when the time of the application is reduced, or when the temperature of the mixture is decreased or its heating eliminated, or when the pulsations are decreased or eliminated, or any combination of the foregoing. What is best in any situation varies with the porosity and density of the masonry material and the choice of the variables of time, velocity, viscosity, temperature, and pulsations. Similar results can be obtained by various choices or combinations. However, in practice it has been found easier to vary the time of application or the viscosity of the thermal insulating liquid to create shallower thermal insulating barrier layers, or the air blast speed.

In one example, cement building blocks were used. The liquid-air mixture in the form of a high velocity stream (about 8,000 feet per minute) was applied to the surface of the block for about 15 to 20 seconds. The viscosity of the thermal insulating liquid, THERMA-PLEX, was relatively low (Ford No. 4 Cup, about 22 seconds). A second application was made, at the same stream velocity as the first application, but with a slightly heavier consistency liquid (Ford Cup No. 4, about 34 seconds), and for the same period of time. Finally a third application was made, at the same velocity and for the same period of time, but with a still more viscous thermal insulating liquid (Ford Cup No. 4, 46 seconds). Examination of the building block revealed a thermal insulating barrier consisting of three layers of thermal insulating barriers, as shown in FIG. 8, with the first layer 2 inches from the face of the block, the second layer 1 inch from the face of the block, and the third layer $\frac{1}{4}$ inch from the face of the block and extending laterally outwardly to the surface of the block.

Tests of the thermal insulating qualities of the masonry wall treated as described herein showed a 44% savings in heat loss as compared to an untreated masonry wall. Tests also showed a 9% savings in heat loss when the surface of the masonry wall is coated by spraying, as in spray painting, with THERMA-PLEX insulating liquid as compared to an untreated wall. Similar results were obtained by applying THERMA-PLEX liquid to the wall surface with a roller. The present invention shows a 35% increase in energy savings over merely spraying or rolling the thermal insulating material onto the surface of the masonry wall.

In thermal insulating an existing building having concrete walls, a stream of a thermal insulating liquid-air mixture (THERMA-PLEX liquid) was applied to the surface of the wall using a cone 24 having a 10 inch diameter at a stream velocity of between 8000 and 11000 feet per minute. The stream was applied for a period of about 10 seconds at which time it was noticed that the liquid was beginning to drip along the surface of the wall. A second application was made, after the liquid appeared to have dried, for a period of about 7 seconds at which time the color of the surface of the wall began to change slightly. Thereafter, a third application was made for about 3 seconds to complete the formation of the thermal insulating barrier B in the wall. The visocity of the thermal insulating liquid, its temperature, and the velocity of the stream were the same for all three applications. With THERMA-PLEX insulating liquid it is preferred that its temperature be between approximately 45° F. and 90° F. Too long a period of application is indicated by excess dripping of the liquid along the surface of the wall or by change of color of the wall surface.

Although THERMA-PLEX liquid is preferred, it is understood other liquids may be used, such as shellac. The liquid which can be applied as a mixture, including a solvent, should when the solvent evaporates, adhere to the masonry particles and become part of the structure. The liquid should be of a kind which does not evaporate or be subject to attack by air pollutants.

What is claimed is:

1. The method of insulating an existing masonry granular structure without substantially altering the outward appearance of the structure, comprising the steps of injecting an insulating liquid within the structure, in situ, to form a first barrier layer at a relatively deep penetration with respect to an exposed accessible surface of the structure, and subsequently injecting an insulating liquid within the structure, in situ, to form a second barrier layer at a relatively shallow penetration with respect to the surface of the structure, the barrier layers being in juxtaposition with one another, thereby entrapping dead air between the granules of the masonry structure, wherein the insulating liquid is injected into the structure by means of a liquid-air stream, wherein the first relatively-deep layer is applied under given parameters of viscosity and temperature of the insulating liquid, velocity of the liquid-air stream, and time of application, and wherein any of said given parameters may be varied to apply the second relatively-shallow layer.

2. A masonry structure made in accordance with the method of claim 1.

3. The method of claim 1, further including the application of a third shallower layer between the second layer and the wall surface.

4. The method of claim 3, wherein the temperature, velocity and application time are held constant, and wherein the viscosity is varied to apply each of the three layers.

5. The method of claim 4, wherein the viscosity is determined by Ford Cup No. 4 standards and comprises substantially 22, 34 and 46 seconds for the three layers, respectively.

6. The method of claim 1, wherein the insulating liquid comprises a composition of polymerized methacrylic resins.

7. The method of claim 1, wherein the masonry structure comprises a building wall, and wherein the plurality of barrier layers provides a waterproofing and thermal insulating effect, while preserving the wall against pollutants, aging or decay.

* * * * *